(12) United States Patent
Shimura et al.

(10) Patent No.: US 7,669,367 B2
(45) Date of Patent: Mar. 2, 2010

(54) SUPPORT STRUCTURE FOR VEHICULAR SLIDE DOOR

(75) Inventors: Ryoji Shimura, Yokohama (JP); Hiroshi Morinaga, Yokohama (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/896,838

(22) Filed: Sep. 6, 2007

(65) Prior Publication Data

US 2008/0078124 A1    Apr. 3, 2008

(30) Foreign Application Priority Data

Sep. 28, 2006    (JP) ............................ P2006-265860

(51) Int. Cl.
    *E05D 15/10*    (2006.01)
(52) U.S. Cl. .............................. 49/213; 49/223; 296/155
(58) Field of Classification Search .................... 49/209, 49/213, 216, 218, 219, 223–225, 360; 296/155
    See application file for complete search history.

(56) References Cited

U.S. PATENT DOCUMENTS

| | | | | |
|---|---|---|---|---|
| 4,152,872 A | * | 5/1979 | Tanizaki et al. ................ | 49/214 |
| 4,464,863 A | * | 8/1984 | Chikaraishi et al. ........... | 49/213 |
| 4,502,246 A | * | 3/1985 | Minami ........................ | 49/322 |
| 4,530,184 A | * | 7/1985 | Chikaraishi et al. ........... | 49/213 |
| 4,559,740 A | * | 12/1985 | Tuchiya et al. ................ | 49/216 |
| 4,662,109 A | * | 5/1987 | Yui et al. ...................... | 49/214 |
| 4,981,321 A | * | 1/1991 | Watanabe et al. ........... | 296/155 |
| 5,967,595 A | * | 10/1999 | Heya et al. .................. | 296/155 |
| 5,979,971 A | * | 11/1999 | Mizuki et al. ............... | 296/155 |
| 5,992,097 A | * | 11/1999 | Makiuchi et al. .............. | 49/216 |
| 6,036,257 A | * | 3/2000 | Manuel ....................... | 296/155 |
| 6,530,619 B2 | * | 3/2003 | Fukumoto et al. ........... | 296/155 |
| 6,539,670 B2 | * | 4/2003 | Haag et al. ..................... | 49/141 |
| 6,781,058 B1 | * | 8/2004 | DeCicco et al. ........... | 174/72 A |
| 6,826,869 B2 | * | 12/2004 | Oberheide .................... | 49/360 |
| 6,932,417 B2 | * | 8/2005 | Barczynski et al. ......... | 296/155 |
| 6,935,071 B2 | * | 8/2005 | Yokomori et al. ............. | 49/360 |
| 7,243,461 B2 | * | 7/2007 | Rogers et al. ................. | 49/360 |
| 7,347,025 B2 | * | 3/2008 | Fukumoto et al. ............ | 49/360 |
| 7,354,100 B2 | * | 4/2008 | Yokomori et al. ........... | 296/155 |

FOREIGN PATENT DOCUMENTS

JP    2006-002383    1/2006

\* cited by examiner

*Primary Examiner*—Katherine W Mitchell
*Assistant Examiner*—Michael J Keller
(74) *Attorney, Agent, or Firm*—The Nath Law Group; Jerald L. Meyer; Stanley N. Protigal

(57) ABSTRACT

A horizontal wall is formed with a notch groove. The notch groove is formed by cutting a tip end of the horizontal wall on the side of the vehicle body substantially along an approaching/separating direction between a vehicle body and a slide door. A connecting unit which turnably connects a plate and a roller holder of a connection assembly to each other is movably inserted into the notch groove. The plate and the horizontal wall of the bracket are fastened to each other in a state where they are superposed on each other.

8 Claims, 6 Drawing Sheets

SUPPORT STRUCTURE FOR VEHICULAR SLIDE DOOR

CROSS REFERENCE TO RELATED APPLICATION

This application is based upon and claims the benefit of priority from a Japanese Patent Application No. 2006-265860, filed on Sep. 28, 2006; the entire contents of which are incorporated herein by reference.

BACKGROUND OF THE INVENTION

1. Field of the Invention

The present invention relates to a support structure for a vehicular slide door.

2. Description of the Related Art

Conventionally, as a door for opening and closing a side opening of an automobile, there is a slide door which slides in the longitudinal direction along a side of a vehicle body. In this case, the vehicle body is provided at its three locations (an upper portion, a central portion and a lower portion) with guide rails extending in the longitudinal direction. A roller base is attached to each of the guide rails. The roller base moves in the longitudinal direction along the guide rail. Base plates (brackets) are mounted on the slide door in correspondence with the upper, central and lower guide rails such that the base plates project toward the vehicle body. Because the base plates are fastened to the roller bases, the slide door can move in the longitudinal direction along the guide rails.

Each base plate is formed at its one end with a long hole extending in the widthwise direction of the vehicle, and each roller base is formed with a bolt mounting hole. The base plate and the roller base are fastened to each other by threadedly engaging a bolt which penetrates the long hole with the bolt mounting hole. When the base plate and the roller base are fastened to each other, the fastening position therebetween is adjusted along the longitudinal direction of the long hole within a range where the bolt which is temporarily inserted into the bolt mounting hole relatively moves along the long hole. With this configuration, the mounting position of the slide door with respect to the vehicle body is adjusted (for example, Japanese Patent Application Laid-open No. 2006-2383).

In the support structure of a vehicular slide door of this kind, in the connected portion between the roller base and the bracket of the slide door, it is desired to secure higher rigidity. Further, it is desired to adjust the mounting position of the slide door with respect to the vehicle body more easily.

SUMMARY OF THE INVENTION

It is therefore an object of the present invention to obtain a support structure for a vehicular slide door in which necessary rigidity can easily be secured and a mounting operation can easily be carried out.

A first aspect of the present invention provides a support structure for a vehicular slide door comprising a bracket fixed to the slide door, and a connection assembly in which a roller holder for holding a roller which rolls along a guide rail provided on a vehicle body and a mounting portion to which the bracket is fastened are relatively turnably connected to each other through a connecting unit including a connection shaft, wherein the bracket includes a substantially horizontally extending horizontal wall, the horizontal wall is formed with a notch groove which is formed by cutting a tip end of the horizontal wall on the side of the vehicle body substantially along an approaching/separating direction between the vehicle body and the slide door, and the connecting unit is movably inserted into the notch groove, and the mounting portion and the horizontal wall are fastened to each other in a state where they are superposed on each other.

It is preferable that the connection assembly has a portion which vertically sandwiches the horizontal wall.

It is preferable that the mounting portion has two plates for vertically sandwiching the horizontal wall.

It is preferable that the two plates are fastened to the horizontal wall by a common fastening tool.

It is preferable that the two plates are fastened to the horizontal wall by separate fastening tools, the fastening tools which fasten the connection shaft, the plates and the horizontal wall to each other are disposed substantially straightly along the approaching/separating direction.

It is preferable that the mounting portion is provided with a projection for limiting a turning movement of the roller holder in one direction.

It is preferable that the roller holder includes an upper wall and a lower wall which are parallel to each other substantially horizontally, and a vertical wall which connects vehicle body side ends of the upper wall and the lower wall, the mounting portion is disposed at a position between the upper wall and the lower wall, the connecting unit includes a holding cylinder which is fixed to the mounting portion at a position between the upper wall and the lower wall and which turnably holds the connection shaft, an upper end of the connection shaft is fixed to the upper wall, a lower end of the connection shaft is fixed to the lower wall, and the holding cylinder and superposed portions of the mounting portion and the horizontal wall are sandwiched between the upper wall and the lower wall in a state where the mounting portion and the horizontal wall are fastened to each other.

DETAILED DESCRIPTION OF THE PREFERRED EMBODIMENTS

First Embodiment

Figure 1:
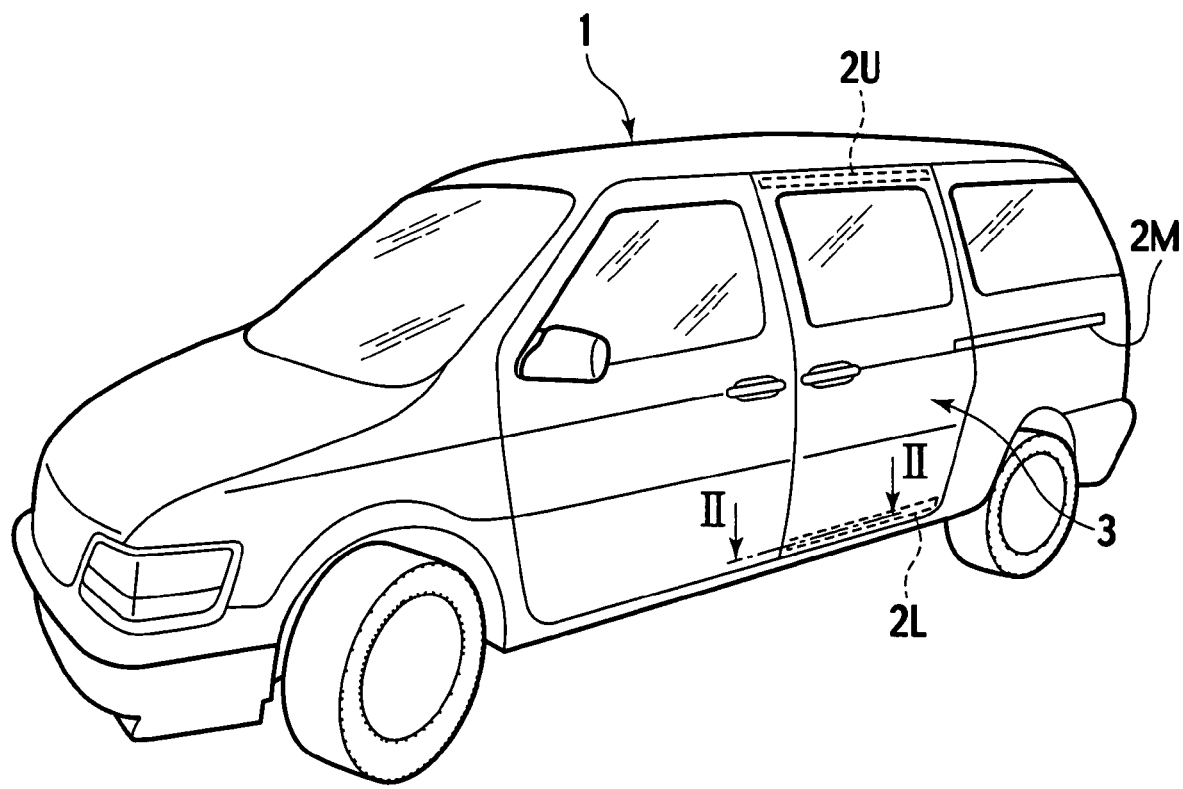
FIG. 1 is a perspective view showing an automobile employing a support structure for a vehicular slide door according to a first embodiment of the present invention.
Figure 2:
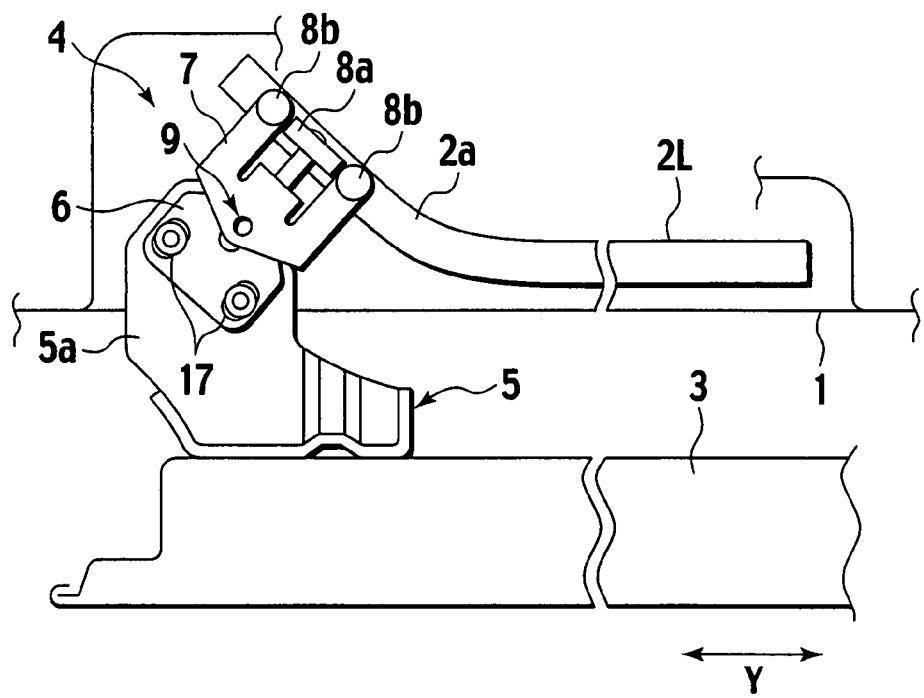
FIG. 2 is a sectional view taken along a line II-II in FIG. 1.
Figure 3:
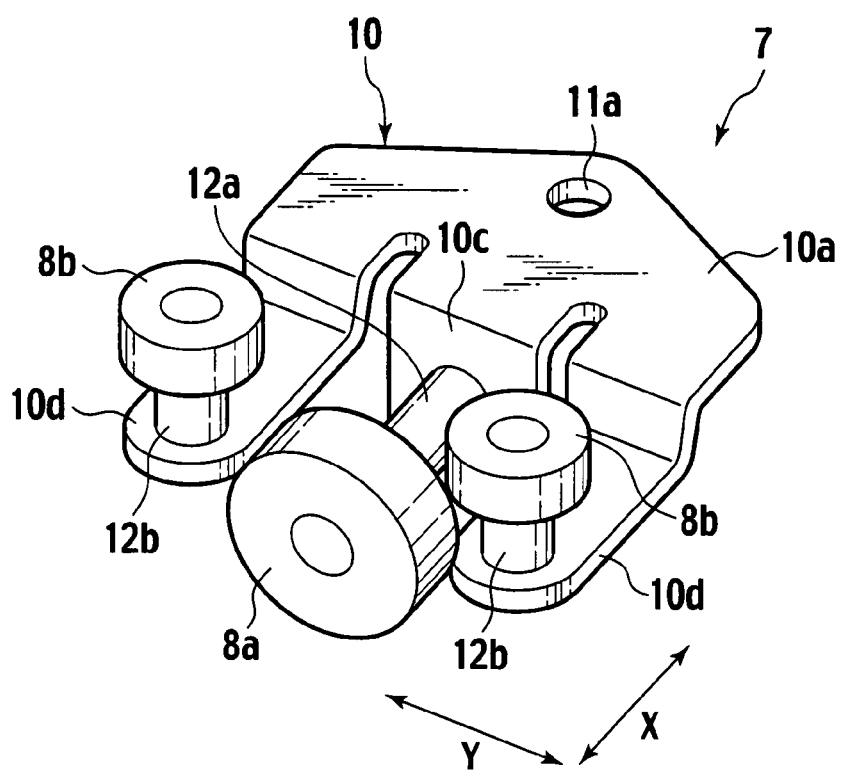
FIG. 3 is a perspective view of a roller holder included in the support structure for a vehicular slide door according to the first embodiment.
Figure 4:
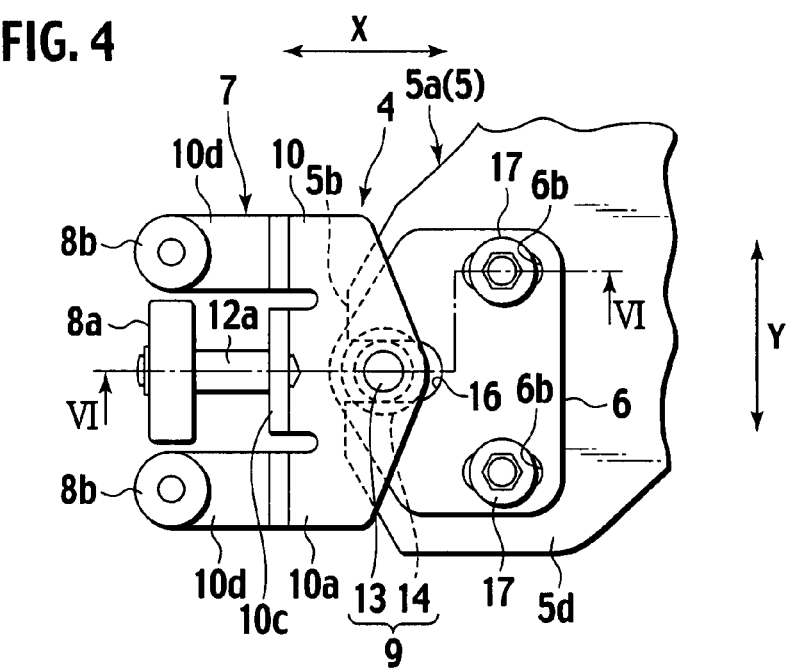
FIG. 4 is a plan view of the support structure for a vehicular slide door according to the first embodiment.
Figure 5:
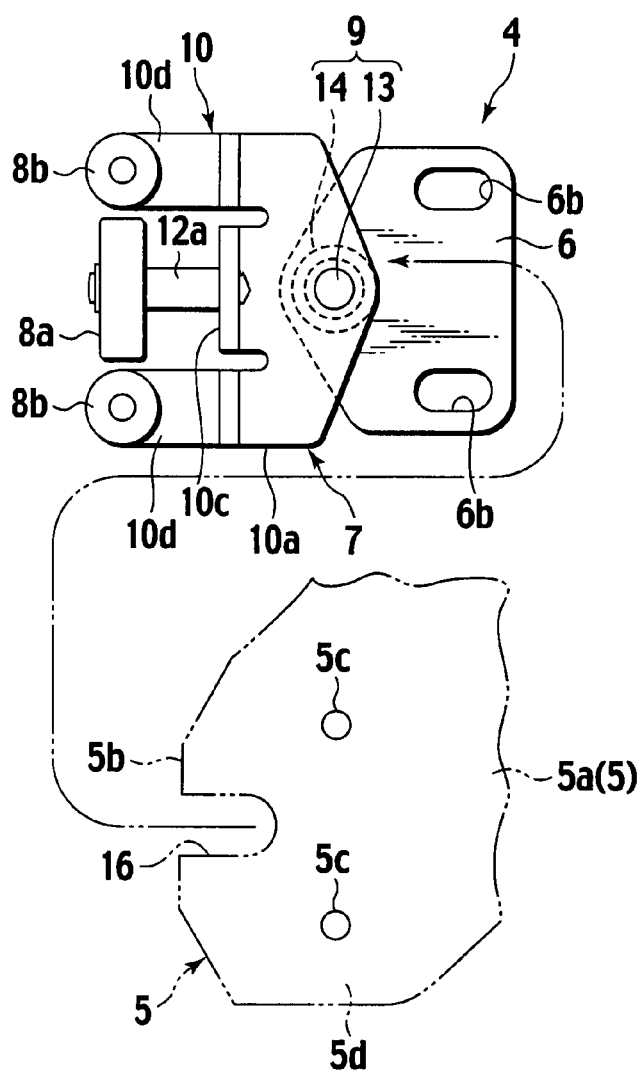
FIG. 5 is a plan view of the support structure for a vehicular slide door according to the first embodiment before fastening.
Figure 6:
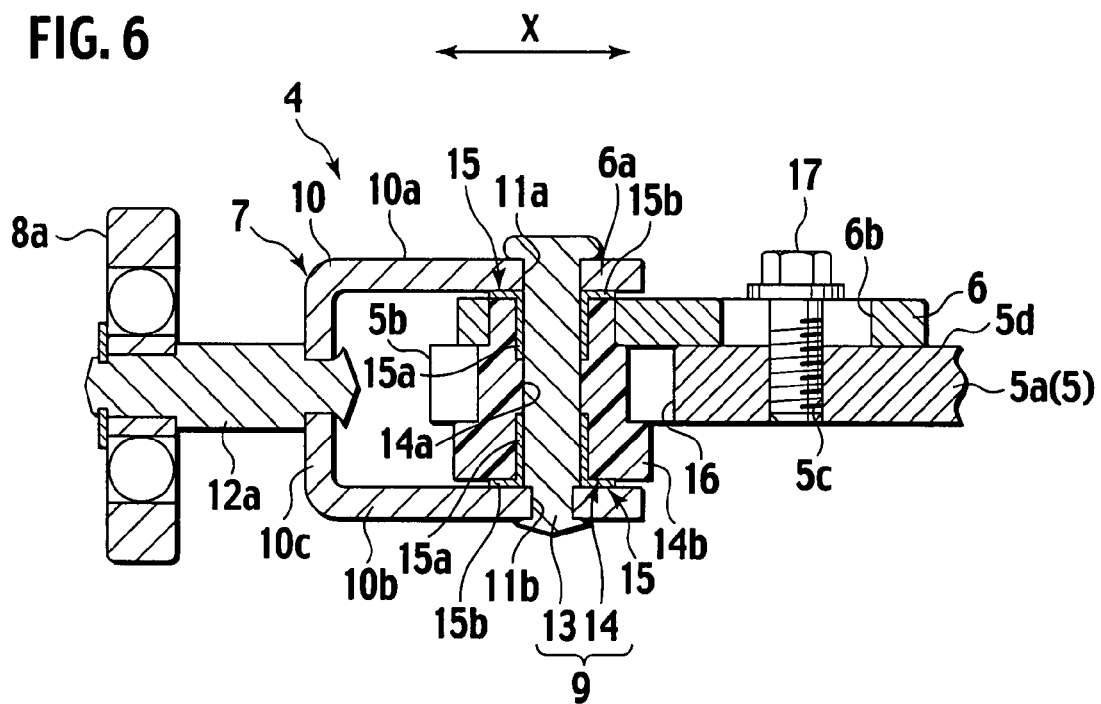
FIG. 6 is a sectional view taken along a line VI-VI in FIG. 4.
Figure 7:
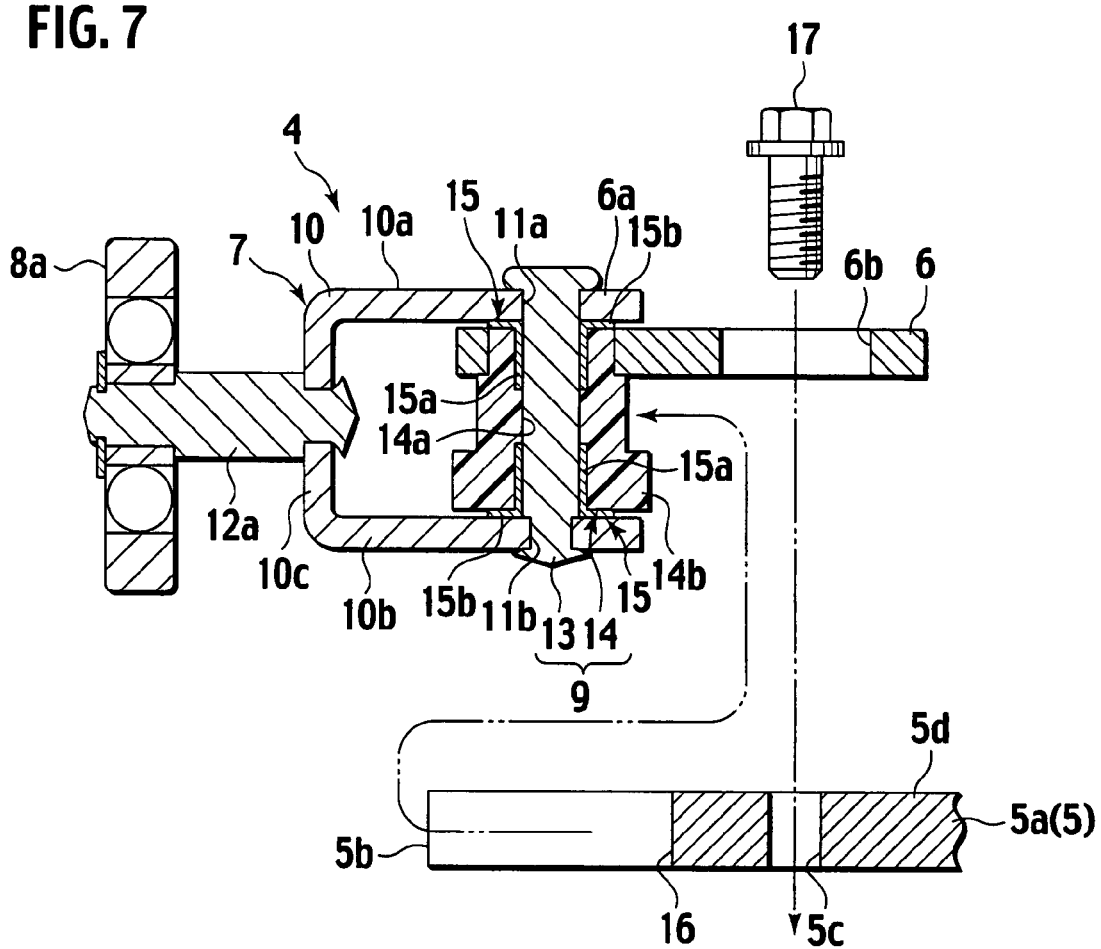
FIG. 7 is a sectional view of the support structure for a vehicular slide door according to the first embodiment before fastening at the same position as that shown in FIG. 6.

FIG. 1 is a perspective view showing an automobile employing a support structure for a vehicular slide door according to a first embodiment of the present invention. FIG. 2 is a sectional view taken along a line II-II in FIG. 1. FIG. 3 is a perspective view of a roller holder included in the support structure for a vehicular slide door. FIG. 4 is a plan view of the support structure for a vehicular slide door. FIG. 5 is a plan view of the support structure for a vehicular slide door before fastening. FIG. 6 is a sectional view taken along a line VI-VI in FIG. 4. FIG. 7 is a sectional view of the support structure for a vehicular slide door before fastening at the same position as that shown in FIG. 6. In the drawings, a symbol X represents an approaching/separating direction between the vehicle body and the slide door, and a symbol Y represents an extending direction of the guide rail. In the following explanation, "on the side of the vehicle body" in the approaching/separating direction is simply described as a vehicle body side, and "on the side of the slide door" in the approaching/separating direction is simply described as a slide door side.

As shown in FIG. 1, an upper portion, a central portion and a lower portion of a side of the vehicle body 1 are respectively provided with guide rails 2U, 2M and 2L extending in the longitudinal direction. A slide door 3 is supported by the guide rails 2U, 2M and 2L such that the slide door 3 can move in the longitudinal direction, and the slide door 3 opens and closes an opening formed in the side of the vehicle body 1. The three guide rails 2U, 2M and 2L have substantially the same support structure for a vehicular slide door according to the present embodiment and thus, only a structure concerning the lower guide rail 2L will be explained.

As shown in FIG. 2, the guide rail 2L extends horizontally and straightly along the longitudinal direction as a whole. However, a front end 2a of the guide rail 2L is gently curved inward in the widthwise direction of the vehicle and extending obliquely forward.

The slide door 3 is mounted on the vehicle body 1 through a connection assembly 4. The connection assembly 4 longitudinally moves along the guide rail 2L. The connection assembly 4 includes a plate 6 as a mounting portion on which a bracket 5 fixed to the slide door 3 is mounted. The connection assembly 4 also includes a roller holder 7 which rotatably holds rollers 8a and 8b which roll along the guide rail 2L, and a connecting unit 9 which connects the plate 6 and the roller holder 7 with each other such that they relatively turn with respect to each other. The guide rail 2L has a substantially C-shaped cross section (not shown) which opens toward the slide door 3. If the rollers 8a and 8b roll in the guide rail 2L, the connection assembly 4 slides along the guide rail 2L, and the slide door 3 which is fixed to the connection assembly 4 longitudinally moves.

As shown in FIG. 6, the roller holder 7 includes a base 10 which is formed by appropriately bending a plate member having a substantially constant thickness. The base 10 includes an upper wall 10a and a lower wall 10b which are extending substantially horizontally and which are in parallel to each other, and a vertical wall 10c which extends substantially vertically and which connects vehicle body sides of the upper wall 10a and the lower wall 10b with each other. As shown in FIG. 3, the vertical wall 10c is provided at its opposite sides in the longitudinal direction (extending direction of the guide rail 2L) with tongue-like lateral walls 10d and 10d extending horizontally toward the vehicle body 1 stepwisely from an end edge of the upper wall 10a on the side of the vehicle body 1.

Substantially circular through holes 11a and 11b are formed in the upper wall 10a and the lower wall 10b on the side of the slide door 3. The through holes 11a and 11b are superposed on each other in the vertical direction. A connection shaft 13 extending vertically is inserted through the through holes 11a and 11b.

A shaft 12a extending horizontally toward the vehicle body 1 is mounted on the vertical wall 10c. The roller 8a is rotatably supported by the shaft 12a, and the roller 8a rolls on a bottom surface in the cross section of the guide rail 2L. Shafts 12b extending vertically upward are mounted on the lateral walls 10d and 10d, respectively. The rollers 8b are rotatably supported by the shafts 12b, respectively, and the rollers 8b roll on the side surface in the cross section of the guide rail 2L.

The connecting unit 9 includes the substantially vertically extending connection shaft 13, and a holding cylinder 14 through which the connection shaft 13 passes.

As shown in FIG. 6, the connection shaft 13 vertically penetrates the through holes 11a and 11b formed in the upper wall 10a and the lower wall 10b of the base 10. A portion of the connection shaft 13 projecting upward from the through hole 11a and a portion of the connection shaft 13 projecting downward from the through hole 11b are swaged and expanded radially outward, and the expanded portions vertically sandwich the upper wall 10a and the lower wall 10b, thereby fixing (retaining) the connection shaft 13 to the base 10.

The connection shaft 13 is turnably inserted through the holding cylinder 14 (through hole 14a). The holding cylinder 14 is disposed such that the holding cylinder 14 is sandwiched between the upper wall 10a and the lower wall 10b of the base 10 in the axial direction. An upper end is inserted into the through hole 6a formed in the plate 6 and is mounted on the plate 6. The holding cylinder 14 is made of hard synthetic resin.

In the connecting unit 9, the connection shaft 13 is fixed to the roller holder 7 and the holding cylinder 14 is fixed to the plate 6. If the connection shaft 13 turns in the holding cylinder 14, the roller holder 7 and the plate 6 can relatively turn. Collars 15 having flanges are mounted on upper and lower opening edges of the through hole 14a of the holding cylinder 14. A cylindrical interior 15a of the collar 15 is inserted in a gap between the connection shaft 13 and the holding cylinder 14 to reduce a friction resistance and a wearing therebetween. The flange 15b is inserted in a gap between the holding cylinder 14 and the upper wall 10a or the lower wall 10b to reduce a friction resistance and a wearing therebetween.

In the above configuration, when the slide door 3 is to be mounted on the vehicle body 1, the connection assembly 4 is previously attached to the guide rail 2L, and the slide door 3 is mounted on the connection assembly 4. At that time, the plate 6 of the connection assembly 4 and the bracket 5 are fastened to each other.

The bracket 5 includes a substantially horizontally extending horizontal wall 5a. The horizontal wall 5a is formed with a notch groove 16 which is notched from a tip end 5b of the horizontal wall 5a substantially along an approaching/separating direction X (opening direction of the cross section of the guide rail 2L: substantially widthwise direction of the vehicle in the straight portion of the guide rail 2L) between the vehicle body 1 and the slide door 3. The holding cylinder 14 of the connection assembly 4 is inserted into the notch groove 16. At that time, the width of the notch groove 16 is set substantially equal to or slightly greater than the width (diameter) of the holding cylinder 14 so that the holding cylinder 14 is sandwiched between both the sidewalls of the notch groove 16. If an appropriate external force is applied, the holding cylinder 14 can move in the notch groove 16 along the extending direction of the notch groove 16 (i.e., the approaching/separating direction X).

The connection assembly 4 is provided with portions which protrude from the notch groove 16 outward in the widthwise direction of the notch groove 16 at upper and lower ends of the holding cylinder 14 (portions projecting from upper and lower opening ends of the notch groove 16), and a peripheral edge (horizontal wall 5a) of the notch groove 16 is vertically sandwiched between the protruding portions. In the present embodiment, the plate 6 protrudes outward in the widthwise direction of the notch groove 16 above the notch groove 16, and the flange 14b of the holding cylinder 14 protrudes outward in the widthwise direction of the notch groove 16 below the notch groove 16.

In the present embodiment, the plate 6 is disposed on the upper surface 5d of the horizontal wall 5a of the bracket 5 substantially entirely, and the plate 6 and the horizontal wall 5a are vertically superposed on each other. The portion of the horizontal wall 5a which is superposed on the plate 6 is formed with a plurality of female thread holes 5c with which bolts 17 as fastening tools are threadedly engaged. The plate 6 is formed with through holes 6b corresponding to the female thread holes 5c. The bolts 17 inserted through the through holes 6b are threadedly engaged with the female thread holes 5c, thereby fastening the plate 6 and the bracket 5.

At this time, the plurality of through holes 6b are formed as long holes which are parallel to each other. Even when the relative positions of the plate 6 and the bracket 5 in the approaching/separating direction X are changed in a state where the holding cylinder 14 is inserted into the notch groove 16, the superposed state between the long through holes 6b and the female thread holes 5c can be obtained.

Therefore, according to the present embodiment, if the connecting unit 9 is inserted into the notch groove 16, a state where the bracket 5 is temporarily held by the connection assembly 4 is obtained, and in this state, the slide door 3 is moved, the mounting position of the slide door 3 with respect to the connection assembly 4 in the approaching/separating direction X is adjusted, and the plate 6 and the bracket 5 can be fastened to each other through the bolts 17.

According to the support structure for the slide door of the present embodiment, the slide door 3 can be moved along the approaching/separating direction X while keeping the state where the bracket 5 and the slide door 3 are temporarily held by the connection assembly 4, and the slide door 3 can finally be mounted on the vehicle body 1 at an appropriate position in the approaching/separating direction X. Therefore, it is possible to prevent the slide door 3 from rattling irrespective of manufacturing variation.

According to the present embodiment, in the connection assembly 4, the connecting unit 9 which relatively turnably connects the roller holder 7 and the plate 6 with each other can be used as a guide when the positions of the bracket 5 and the slide door 3 are adjusted with respect to the connection assembly 4 in the approaching/separating direction X. Therefore, it is possible to simplify the structure as compared with a case where a guide is separately provided.

According to the present embodiment, the plate 6 of the connection assembly 4 is fastened to the horizontal wall 5a in a state where the plate 6 is superposed on the horizontal wall 5a of the bracket 5. Therefore, the rigidity of the fastened portion between the connection assembly 4 and the bracket 5 can be enhanced due to this superposed portion.

According to the present embodiment, since the connection assembly 4 vertically sandwiches the horizontal wall 5a of the bracket 5, the connection assembly 4 and the bracket 5 can be fastened to each other more strongly.

Further, according to the present embodiment, if the connection assembly 4 and the bracket 5 are fastened to each other, as shown in FIG. 6, the holding cylinder 14 and the superposed portions of the plate 6 and the horizontal wall 5a are vertically sandwiched between the upper wall 7a and the lower wall 7b of the roller holder 7. That is, the roller holder 7 is turnably supported through the connection shaft 13 by a portion where the plate 6 and the horizontal wall 5a are superposed and its rigidity is enhanced. Thus, the rigidity in the fastened portions between the connection assembly 4 and the bracket 5 can be enhanced.

According to the present embodiment, the holding cylinder 14 is fitted into the notch groove 16 formed in the horizontal wall 5a of the bracket 5 having the predetermined thickness without almost no gap. Therefore, it is possible to prevent the connecting unit 9 from deviating and falling in the longitudinal direction (extending direction Y of the guide rail 2L), and the rigidity of the mounting portion between the connection assembly 4 and the bracket 5 in the longitudinal direction can be enhanced.

According to the present embodiment, the plate 6 is formed with the through holes 6b through which the bolts 17 as fastening tools are inserted, and the horizontal wall 5a are formed with the female thread holes 5c with which the bolts 17 are engaged. Conversely, the plate 6 can be formed with the female thread holes and the horizontal wall 5a can be formed with the through holes. Through holes having substantially circular cross sections can be formed instead of the female thread holes, and nuts which are engaged with the bolts can be used.

The holding cylinder 14 can be provided with a flat surface which slides on the side of the notch groove 16.

Second Embodiment

Figure 8:
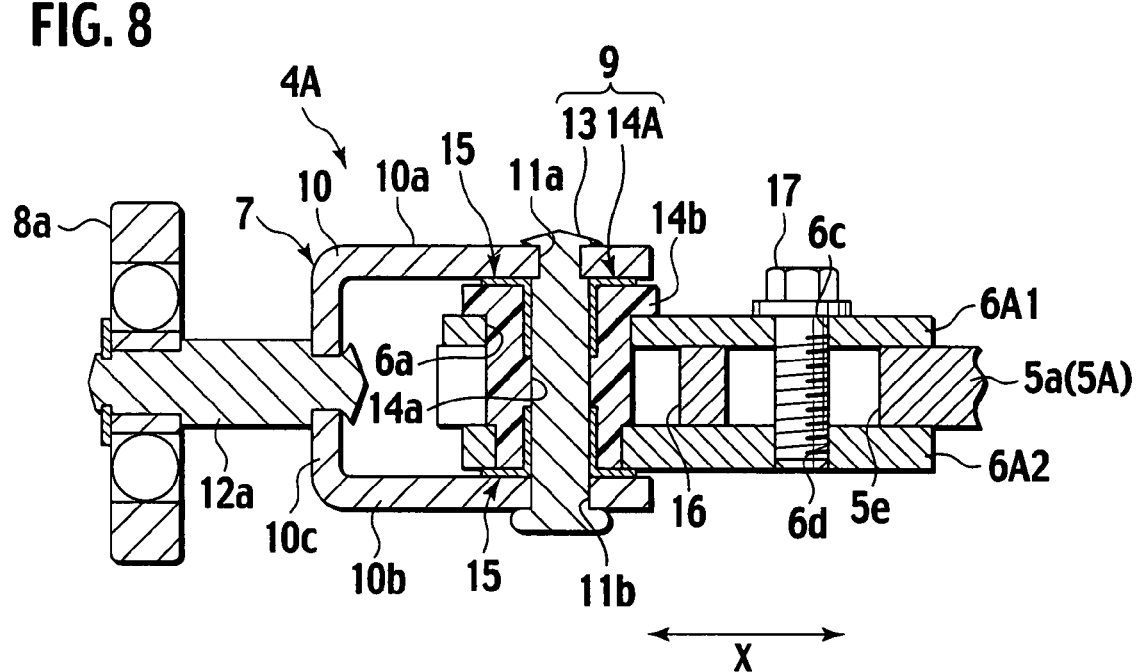
FIG. 8 is a vertical sectional view (a sectional view at the same position as that shown in FIG. 6) of a support structure for a vehicular slide door according to a second embodiment of the present invention.
Figure 9:
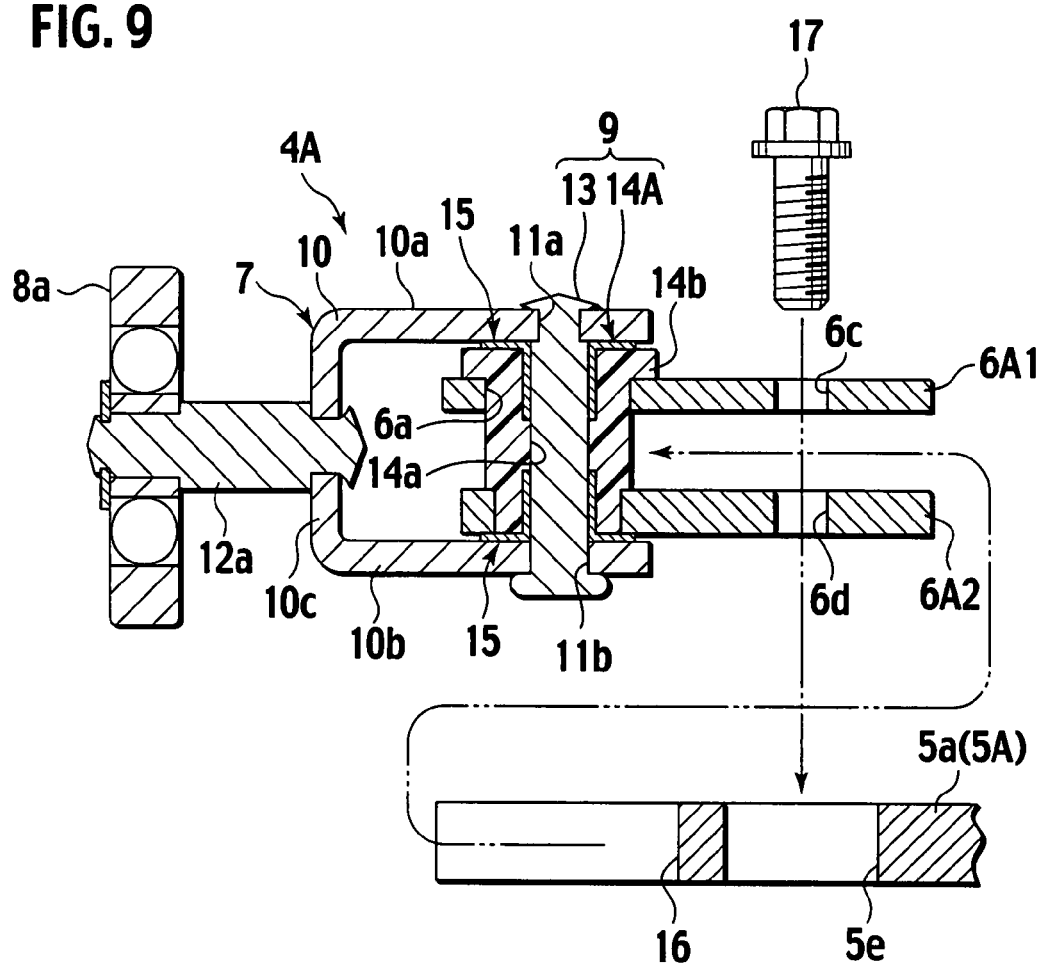
FIG. 9 is a vertical sectional view (a sectional view at the same position as that shown in FIG. 7) of the support structure for a vehicular slide door according to the second embodiment.

FIG. 8 is a vertical sectional view (a sectional view at the same position as that in FIG. 6) of a support structure for a vehicular slide door according to a second embodiment of the present invention. FIG. 9 is a vertical sectional view (a sectional view at the same position as that in FIG. 7) of the support structure for a vehicular slide door before fastening. This embodiment has the same constituent elements as those of the first embodiment. Like constituent elements are therefore designated with like reference symbols, and redundant explanations will be omitted.

In the present embodiment, the connection assembly 4 includes two plates 6A1 and 6A2 as the mounting portions, and a horizontal wall 5a of a bracket 5A is sandwiched between the two plates 6A1 and 6A2.

The upper plate 6A1 is formed with a through hole 6c having a substantially circular cross section into which the bolt 17 as a fastening tool is inserted. The lower plate 6A2 is formed with a female thread hole 6d with which the bolt 17 is engaged. The horizontal wall 5a is formed with a long through hole 5e extending along the approaching/separating direction X.

A holding cylinder 14A forming the connecting unit 9A penetrates the through hole 6a of the plate 6A1. The holding cylinder 14A has a flange 14b protruding radially outward of the plate 6A1.

According to the present embodiment, since the two plates 6A1 and 6A2 sandwich the horizontal wall 5a vertically, the connection assembly 4A and the bracket 5A can be fastened to each other more strongly.

Particularly, the two plates 6A1 and 6A2 are fastened to the horizontal wall 5a in the state where the plates 6A1 and 6A2 are superposed on the horizontal wall 5a of the bracket 5. Since the number of the superposed plates is increased, the rigidity of the fastened portions between the connection assembly 4 and the bracket 5 can be enhanced.

Since the two plates 6A1 and 6A2 are fastened to the horizontal wall 5a by the bolts 17 as the common fastening tools, the number of parts is reduced, the manufacturing labor is reduced, and the manufacturing cost can be reduced as compared with a case where the plates 6A1 and 6A2 are fastened using different fastening tools.

Third Embodiment

Figure 10:
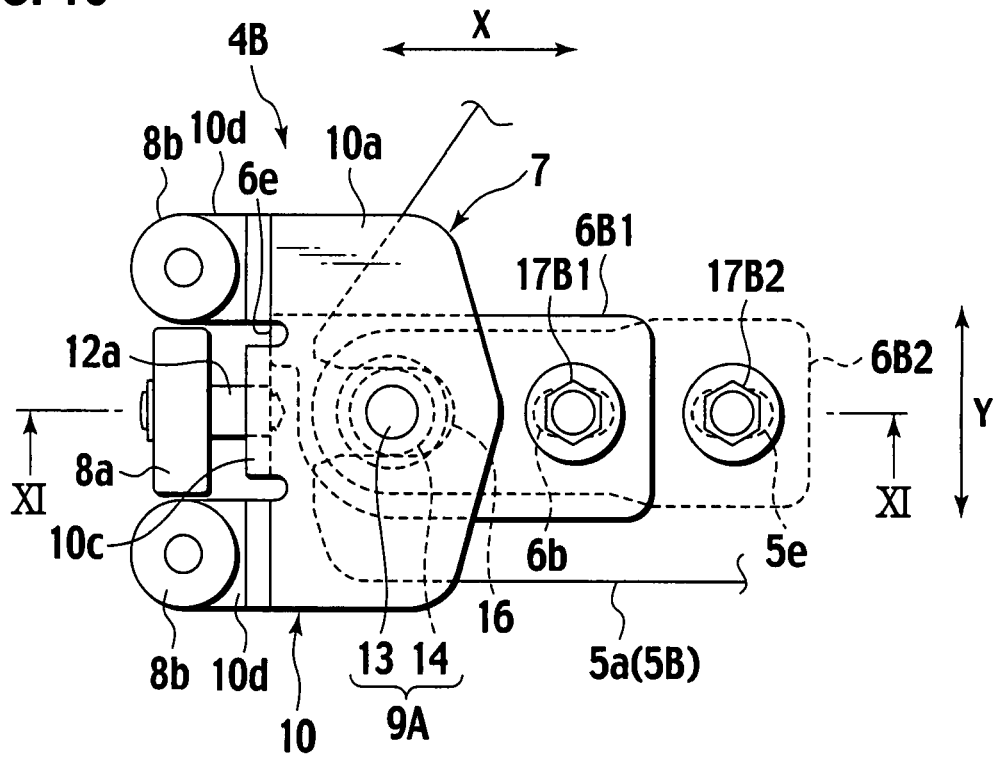
FIG. 10 is a plan view of a support structure for a vehicular slide door according to a third embodiment of the present invention.
Figure 11:
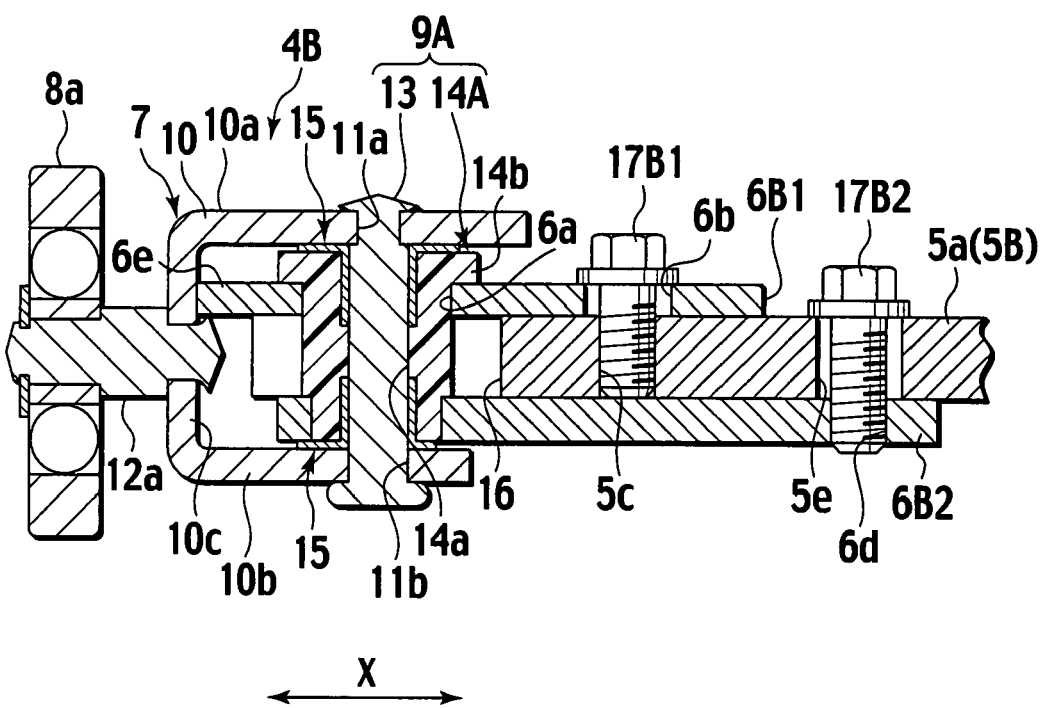
FIG. 11 is a sectional view taken along a line XI-XI in FIG. 10.

FIG. 10 is a plan view of a support structure for a vehicular slide door according to a third embodiment of the present invention. FIG. 11 is a sectional view taken along a line XI-XI in FIG. 10. The third embodiment has like constituent elements as those of the first or second embodiment. Like constituent elements are therefore designated with like reference symbols, and redundant explanations will be omitted.

In the present embodiment, the connection assembly 4B has two plates 6B1 and 6B2 as the mounting portions, and a horizontal wall 5a of a bracket 5B is sandwiched between the two plates 6B1 and 6B2.

In the present embodiment, however, the plates 6B1 and 6B2 are fastened to the horizontal wall 5a by bolts 17B1 and 17B2 as separate fastening tools.

The upper plate 6B1 is formed with a long through hole 6b extending along the approaching/separating direction X, and the bolt 17B1 inserted through the through hole 6b is threadedly engaged with the female thread hole 5c formed in the horizontal wall 5a. The horizontal wall 5a is formed with along through hole 5e extending along the approaching/separating direction X, and the bolt 17B2 inserted through the through hole 5e is threadedly engaged with the female thread hole 6d formed in the lower plate 6B2.

In the present embodiment, as shown in FIG. 10, the two bolts 17B1 and 17B2 as the fastening tools and the connection shaft 13 are disposed on a substantially straight line along the approaching/separating direction X.

Further, a tip end of the upper plate 6B1 on the side of the vehicle body is provided with a projection 6e, and the projection 6e abuts against the vertical wall 10c of the base 10. In the case of the present embodiment, since the projection 6e is provided, the roller holder 7 can turn in the counterclockwise direction from the state shown in FIG. 10, but cannot turn in the clockwise direction.

According to the present embodiment, when a load is applied in the approaching/separating direction X from the connecting unit 9, a moment arm of a rotation moment applied to the bolts 17B1 and 17B2 by this load becomes substantially 0. Therefore, it is possible to prevent the bolts 17B1 and 17B2 from loosening by the rotation moment, and to prevent the fastening force from lowering.

According to the present embodiment, it is possible to suppress unintentional turning motion of the roller holder 7 by a relatively simple structure such that the upper plate 6B1 is provided with the projection 6e.

While preferred embodiments of the present invention have been explained above, the present invention is not limited thereto, and various modifications can be made.

What is claimed is:

1. A support structure for a vehicular slide door comprising a bracket fixed to the slide door, and a connection assembly in which a roller holder for holding a roller which rolls along a guide rail provided on a vehicle body and a mounting portion to which the bracket is fastened are relatively turnably connected to each other through a connecting unit including a connection shaft and a holding cylinder which turnably holds the connection shaft, wherein the bracket includes a substantially horizontally extending horizontal wall, the horizontal wall is formed with a notch groove which is formed by cuffing a tip end of the horizontal wall on the side of the vehicle body substantially along an approaching/separating direction between the vehicle body and the slide door, and the connecting unit is movably inserted into the notch groove, the mounting portion has a plate connected to the horizontal wall, at least one of the horizontal wall and the plate is formed with a long through hole parallel to the notch groove, and the plate and the horizontal wall are fastened by a fastening tool which is passed through the through hole, in a state where the plate and the horizontal wall are superposed on each other, and wherein the plate and the holding cylinder are integral with each other, the holding cylinder is formed to have a projecting portion projecting outwardly in the width direction of the notch groove, and the projecting portion and the plate vertically sandwich a peripheral edge of the notch groove.

2. The support structure for a vehicular slide door according to claim 1, wherein the mounting portion is provided with a projection for limiting a turning movement of the roller holder in one direction.

3. The support structure for a vehicular slide door according to claim 1, wherein the roller holder includes an upper wall and a lower wall which are parallel to each other substantially horizontally, and a vertical wall which connects vehicle body side ends of the upper wall and the lower wall, the plate is disposed at a position between the upper wall and the lower wall, the holding cylinder is fixed to the plate at a position between the upper wall and the lower wall, an upper end of the connection shaft is fixed to the upper wall, a lower end of the connection shaft is fixed to the lower wall, and the holding cylinder and superposed portions of the plate and the horizontal wall are sandwiched between the upper wall and the lower wall in a state where the plate and the horizontal wall are fastened to each other.

4. A support structure for a vehicular slide door comprising:

a bracket fixed to the slide door, and a connection assembly in which a roller holder for holding a roller which rolls along a guide rail provided on a vehicle body and a mounting portion to which the bracket is fastened are relatively turnably connected to each other through a connecting unit including a connection shaft, wherein the bracket includes a substantially horizontally extending horizontal wall, the horizontal wall is formed with a notch groove which is formed by cutting a tip end of the horizontal wall on the side of the vehicle body substantially along an approaching/separating direction between the vehicle body and the slide door, and the connecting unit is movably inserted into the notch groove, the mounting portion has two plates for vertically sandwiching the horizontal wall, at least one of the horizontal wall and the two plates is formed with a long through hole parallel to the notch groove, and the horizontal wall and the two plates are fastened to each other by a fastening tool which is passed through the through hole, in a state where the horizontal wall and the two plates are superposed on each other, and wherein the fastening tool is inserted into the through hole from a side of one of the two plates, and fastens the other of the two plates to the horizontal wall.

5. The support structure for a vehicular slide door according to claim 4, wherein the fastening tool is a common fastening tool common to the two plates, and both of the two plates are fastened to the horizontal wall by the common fastening tool.

6. The support structure for a vehicular slide door according to claim 4, wherein the one of the two plates is fastened to the horizontal wall by another fastening tool, and the fastening tool, said another fastening tool, and the connection shaft are disposed substantially in a straight alignment along the approaching/separating direction.

7. The support structure for a vehicular slide door according to claim 4, wherein the mounting portion is provided with a projection for limiting a turning movement of the roller holder in one direction.

8. The support structure for a vehicular slide door according to claim 4, wherein the roller holder includes an upper wall and a lower wall which are parallel to each other substantially horizontally, and a vertical wall which connects vehicle body side ends of the upper wall and the lower wall, the two plates are disposed at a position between the upper wall and the lower wall, the connecting unit includes a holding cylinder which is fixed to the two plates at a position between the upper wall and the lower wall and which turnably holds the connection shaft, an upper end of the connection shaft is fixed to the upper wall, a lower end of the connection shaft is fixed to the lower wall, and the holding cylinder and superposed portions of the horizontal wall and the two plates are sandwiched between the upper wall and the lower wall in a state where the horizontal wall and the two plates are fastened to each other.

* * * * *